United States Patent
Corrigan et al.

(10) Patent No.: US 6,740,446 B2
(45) Date of Patent: May 25, 2004

(54) ELECTROCHEMICAL CELL WITH ZIGZAG ELECTRODES

(75) Inventors: Dennis A. Corrigan, Troy, MI (US); Lin Higley, Troy, MI (US); Arthur Holland, Commerce Township, MI (US); Marshall Muller, Farmington, MI (US); John A. Smaga, Franklin, MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 10/081,219

(22) Filed: Feb. 22, 2002

(65) Prior Publication Data

US 2002/0160263 A1 Oct. 31, 2002

Related U.S. Application Data

(60) Provisional application No. 60/272,274, filed on Feb. 28, 2001.

(51) Int. Cl.[7] .................................................. H01M 6/10
(52) U.S. Cl. ..................... 429/152; 429/218.2; 429/223
(58) Field of Search ................................. 429/127, 152, 429/154, 158, 160, 162, 211, 218.2, 223

(56) References Cited

U.S. PATENT DOCUMENTS

| | | | | |
|---|---|---|---|---|
| 5,147,737 A | * | 9/1992 | Post et al. ................ | 29/623.3 |
| 5,300,373 A | * | 4/1994 | Shackle .................... | 429/152 |
| 5,460,904 A | * | 10/1995 | Gozdz et al. .............. | 429/162 |
| 5,569,559 A | * | 10/1996 | Fauvarque ................. | 429/305 |
| 5,582,931 A | * | 12/1996 | Kawakami ................. | 429/127 |
| 6,187,473 B1 | * | 2/2001 | Tamezane et al. ........ | 429/164 |
| 6,287,721 B1 | * | 9/2001 | Xie et al. .................. | 429/152 |
| 6,461,762 B1 | * | 10/2002 | Yang et al. ................ | 429/127 |

* cited by examiner

*Primary Examiner*—Susy Tsang-Foster
(74) *Attorney, Agent, or Firm*—Philip H. Schlazer; Marvin S. Siskind

(57) ABSTRACT

An electrochemical cell having electrodes that are arranged in a zigzag configuration with folds and creases. Additional electrodes may be inserted within the folds of the zigzag configuration. Preferably, the electrochemical cell is a prismatic cell.

13 Claims, 13 Drawing Sheets

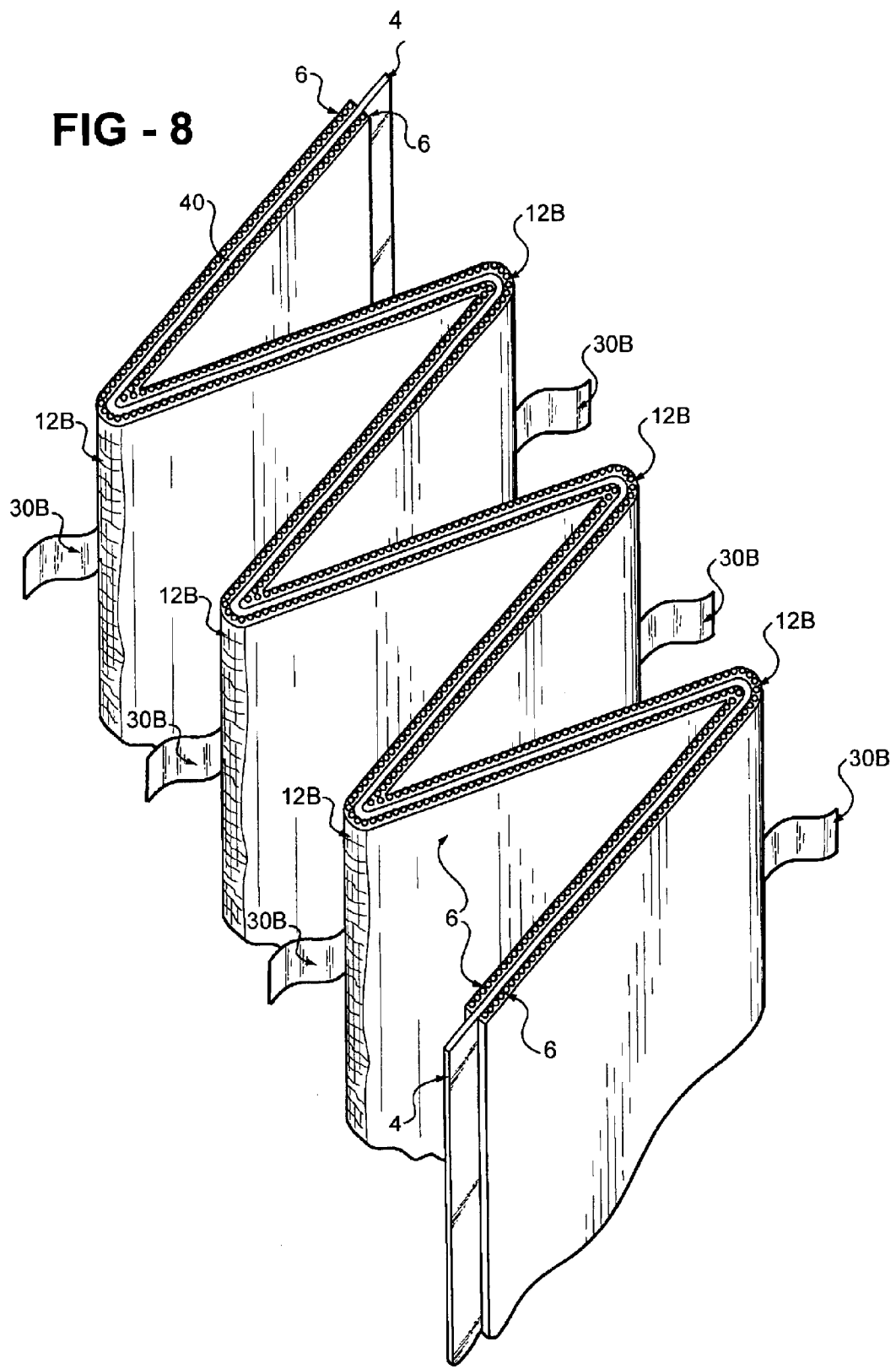

ELECTROCHEMICAL CELL WITH ZIGZAG ELECTRODES

RELATED APPLICATION INFORMATION

This application claims the benefit of U.S. Provisional Application Ser. No. 60/272274 filed Feb. 28, 2001.

FIELD OF THE INVENTION

Generally, this invention relates to rechargeable batteries. More specifically, this invention relates to prismatic rechargeable batteries.

BACKGROUND OF THE INVENTION

In rechargeable electrochemical cells, weight and portability are important considerations. It is also advantageous for rechargeable cells to have long operating lives without the necessity of periodic maintenance. Rechargeable electrochemical cells are used in numerous consumer devices such as calculators, portable radios, and cellular phones. They are often configured into a sealed power pack that is designed as an integral part of a specific device. Rechargeable electrochemical cells can also be configured as larger "cell packs" or "battery packs".

Rechargeable electrochemical cells may be classified as "nonaqueous" cells or "aqueous" cells. Examples of a nonaqueous electrochemical cell are lithium and lithium-ion cells which typically use a liquid organic or polymer electrolyte. Aqueous electrochemical cells may be classified as either "acidic" or "alkaline". An example of an acidic electrochemical cell is a lead-acid cell which uses lead dioxide as the active material of the positive electrode and metallic lead, in a high-surface area porous structure, as the negative active material. Examples of alkaline electrochemical cells are nickel cadmium cells (Ni—Cd) and nickel-metal hydride cells (Ni—MH). Ni—MH cells use negative electrodes having a hydrogen absorbing alloy as the active material. The hydrogen absorbing alloy is capable of the reversible electrochemical storage of hydrogen. Ni—MH cells typically use a positive electrode having nickel hydroxide as the active material. The negative and positive electrodes are spaced apart in an alkaline electrolyte. Preferably, an alkaline electrolyte is an aqueous solution of an alkali metal hydroxide such as such as potassium hydroxide, sodium hydroxide and lithium hydroxide.

Upon application of an electrical potential across a Ni—MH cell, the hydrogen absorbing alloy active material of the negative electrode is charged by the electrochemical absorption of hydrogen and the electrochemical discharge of a hydroxyl ion, forming a metal hydride. This is shown in equation (1):

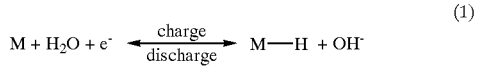

$$M + H_2O + e^- \underset{discharge}{\overset{charge}{\rightleftarrows}} M\text{—}H + OH^- \quad (1)$$

The negative electrode reactions are reversible. Upon discharge, the stored hydrogen is released from the metal hydride to form a water molecule and release an electron.

Hydrogen absorbing alloys called "Ovonic" alloys result from tailoring the local chemical order and local structural order by the incorporation of selected modifier elements into a host matrix. Disordered hydrogen absorbing alloys have a substantially increased density of catalytically active sites and storage sites compared to single or multi-phase crystalline materials. These additional sites are responsible for improved efficiency of electrochemical charging/discharging and an increase in electrical energy storage capacity. The nature and number of storage sites can even be designed independently of the catalytically active sites. More specifically, these alloys are tailored to allow bulk storage of the dissociated hydrogen atoms at bonding strengths within the range of reversibility suitable for use in secondary battery applications.

Some extremely efficient electrochemical hydrogen storage alloys were formulated, based on the disordered materials described above. These are the Ti—V—Zr—Ni type active materials such as disclosed in U.S. Pat. No. 4,551,400 ("the '400 Patent") the disclosure of which is incorporated herein by reference. These materials reversibly form hydrides in order to store hydrogen. All the materials used in the '400 Patent utilize a generic Ti—V—Ni composition, where at least Ti, V, and Ni are present and may be modified with Cr, Zr, and Al. The materials of the '400 Patent are multiphase materials, which may contain, but are not limited to, one or more phases with $C_{14}$ and $C_{15}$ type crystal structures.

Other Ti—V—Zr—Ni alloys, also used for rechargeable hydrogen storage negative electrodes, are described in U.S. Pat. No. 4,728,586 ("the '586 Patent"), the contents of which is incorporated herein by reference. The '586 Patent describes a specific sub-class of Ti—V—Ni—Zr alloys comprising Ti, V, Zr, Ni, and a fifth component, Cr. The '586 Patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them. Other hydrogen absorbing alloy materials are discussed in U.S. Pat. Nos. 5,096,667, 5,135,589, 5,277,999, 5,238,756, 5,407,761, and 5,536,591, the contents of which are incorporated herein by reference.

In order to achieve high power Ni—MH batteries (for example, for use in hybrid electric vehicle applications), it is advantageous to increase the surface area of the electrodes as much as possible. With cylindrical cells, very high surface area can be achieved without a high parts count. Typically, one positive electrode and one negative electrode are wound together with interleaved separator layers that prevent contact of the positive and negative electrodes. The surface area can be increased by using longer and thinner electrodes without increasing the number of electrodes, which remains at two.

However, there are certain disadvantages to using cylindrically wound cells. Special techniques are needed to provide low resistance connection between terminals and the electrodes. Also, the packaging efficiency of cylindrical cells is inferior to that of prismatic cells. As well, there are also some upper limitations on the size of the cylindrical cells that can be manufactured as well as the length of electrodes that can be conveniently wound into a coil (due, at least in part, to a variation in the radius of the winding). Heat transfer can also be an issue with large cylindrical cells.

There have been attempts to build wound prismatic electrochemical cells of various types. Instead by winding around a central spindle rod, the electrodes are wound around a flat plate or fixture (and, hence, are a "flat rolled" configuration). The cross-section of the wound electrodes is be more of a flattened oval rather than round and would fit into a prismatic case.

In a conventional prismatic design of fixed dimensions, the electrode surface area can be increased by increasing the electrode count by using thinner electrodes. A difficulty with this approach is that the cost increases with the increased parts count that is due to the increased electrode count. Hence, there is a need for a prismatic electrochemical cell that can have a large electrode surface area with a small parts count.

SUMMARY OF THE INVENTION

One aspect of the present invention is an electrochemical cell, comprising: at least one positive electrode; at least one negative electrode; and an electrolyte, wherein the at least one positive electrode and/or the at least one negative electrode folded in a zigzag configuration.

Another aspect of the present invention in an electrochemical cell, comprising: an electrode stack including a positive electrode and a negative electrode, the electrode stack folded in a zigzag configuration having folds and creases; and an electrolyte.

Another aspect of the present invention is an electrochemical cell, comprising: an electrode folded in a zigzag configuration having folds and creases; at least one counter-electrode disposed within one or more of the folds of the electrode; and an electrolyte.

Another aspect of the present invention is an electrochemical cell, comprising: an electrode folded in a zigzag configuration having folds and creases; and at least one bifold counter-electrode having a first leg and a second leg, the first leg and the second leg disposed within a first and a second fold on the same side of the zigzag configuration of the electrode.

Another aspect of the present invention is an electrocemical cell, comprising: a bifold negative electrode having a first and a second leg; a bifold positive electrode having a first and a second leg; and an electrolyte, wherein the first leg of the negative electrode is disposed between the first and second leg of the positive electrode, and the first leg of the positive electrode is disposed between the first and second leg of the negative electrode.

Another aspect of the present invention is an electrochemical cell, comprising: an electrode stack including an electrode disposed between a first and a second counter-electrode, the electrode stack folded in a zigzag configuration with folds and creases; and an electrolyte.

Preferably, the electrochemical cells disclosed above are prismatic electrochemical cells.

BRIEF DESCRIPTION OF THE DRAWINGS

FIG. 8 is a trielectrode zigzag electrode stack that includes a central positive electrode disposed between two negative electrodes and which also includes negative current collection tabs;

DETAILED DESCRIPTION OF THE INVENTION

Figure 1A:
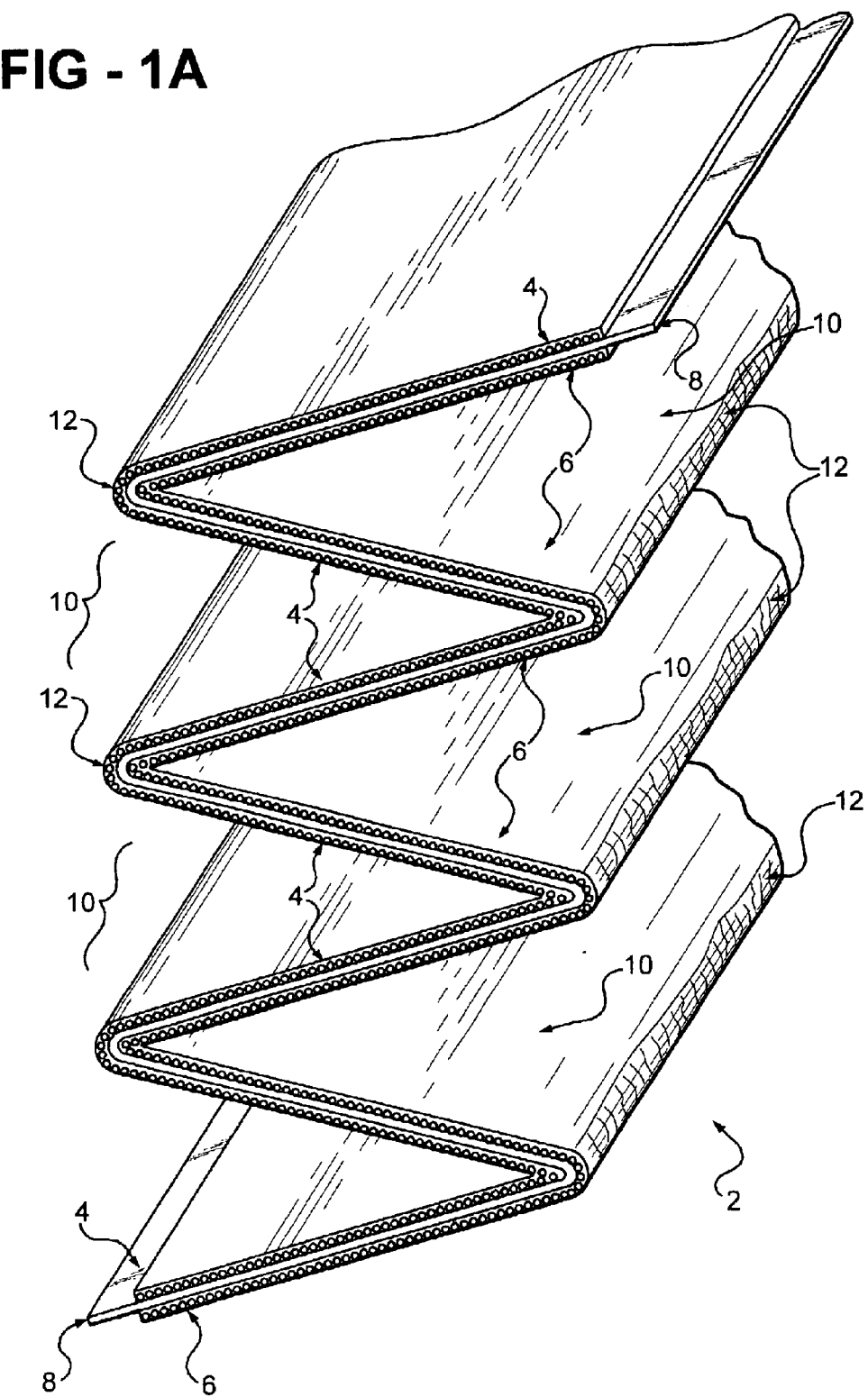
FIG. 1A shows a an embodiment of the present invention of a zigzag bielectrode stack folded in a zigzag configuration.

FIG. 1A shows a first embodiment of the present invention. The embodiment shown is referred to as the "bielectrode zigzag stack". The bielectrode zigzag stack 2 comprises a positive electrode 4, a negative electrode 6, and a separator 8 disposed in between the positive electrode 4 and the negative electrode 6. It is noted that the negative electrode serves as a "counter electrode" for the positive and the positive electrode serves as a "counter-electrode" for the negative. (That is, the positive and negative electrodes are "counter electrodes" of each other).

Figure 1B:
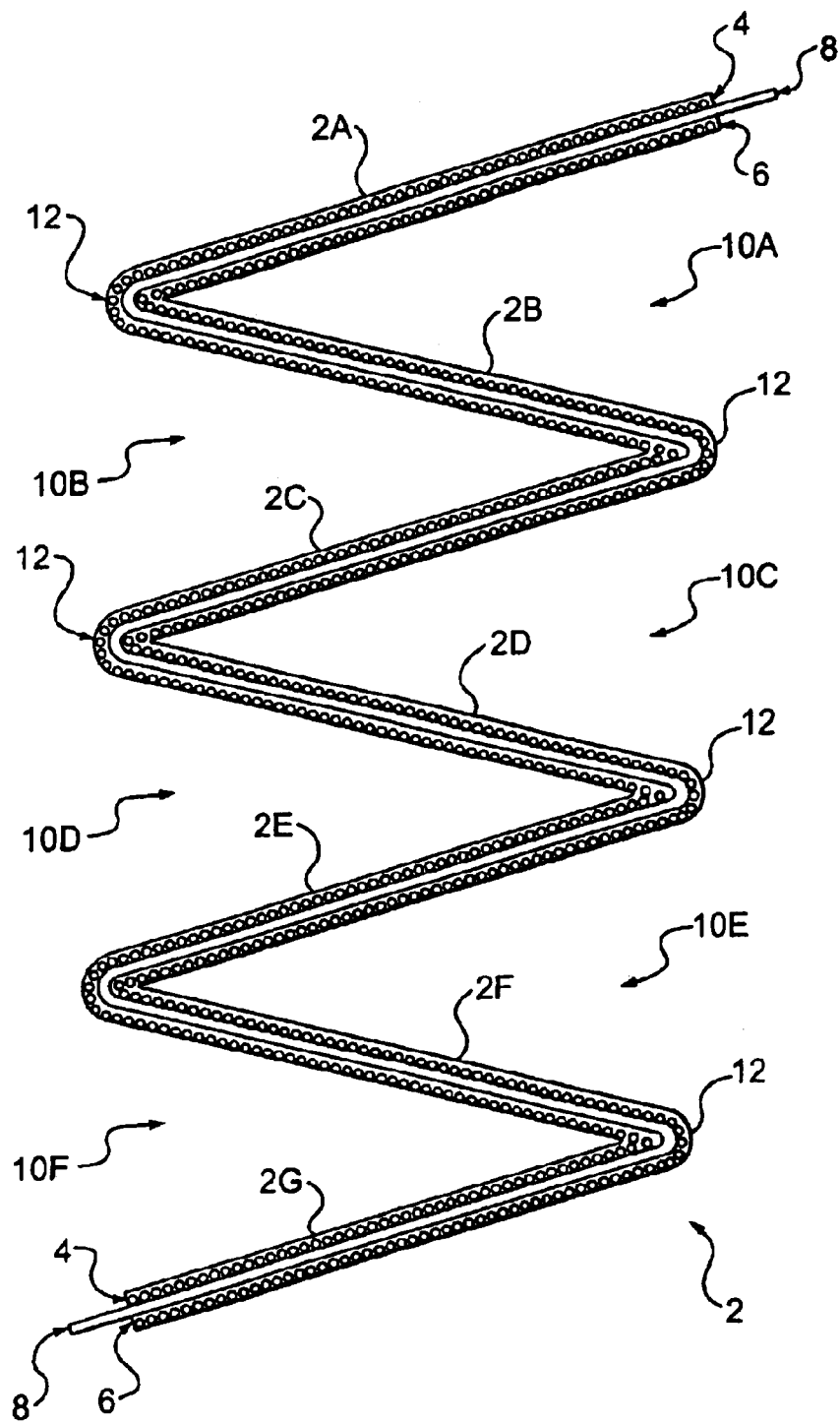
FIG. 1B shows a cross-sectional view of the zigzag bielectrode stack from FIG. 1A.

The electrode stack 2 is repeatedly folded over back and forth (in a accordion-like fashion) to form a repeatable zigzag configuration. The closed ends of the zigzag configuration are referred to as the fold lines or creases 12. The V-shaped regions 10 between adjacent segments of the zigzag configuration are referred to as the folds 10 of the configuration. FIG. 1B shows a cross-sectional view of the zigzag electrode stack 2 from FIG. 1A. The zigzag electrode stack 2 has segments 2A through 2G and fold lines 12. The V-shaped regions between adjacent segments (such as between segments 2A and 2B) are folds 10A through 10F. Folds 10A, 10C and 10E are folds on one side of the zigzag configuration while folds 10B, 10D and 10F are all folds on the opposite side of the zigzag configuration. It is noted that the segments 2A through 2G of the zigzag electrode stack will be pushed close together in a prismatic battery case.

The bielectrode zigzag electrode stack will have an electrode count of two, but can be packaged in a conventional prismatic cell case with high packaging efficiency. This allows for very high surface area with a low parts count, but avoids the packaging efficiency issues of cylindrical cells as well as some of the mechanical assembly problems of wound cells. In the bielectrode zigzag electrode stack shown in FIGS. 1A and 1B, with two electrodes, only one side of each electrode is adjacent to a counter electrode and, hence, only one side of each electrode is utilized. Thus only one-half of the electrode surface area is utilized. It is noted that the electrode material may optionally be removed at the fold lines or creases 12 to facilitate folding.

Figure 2:
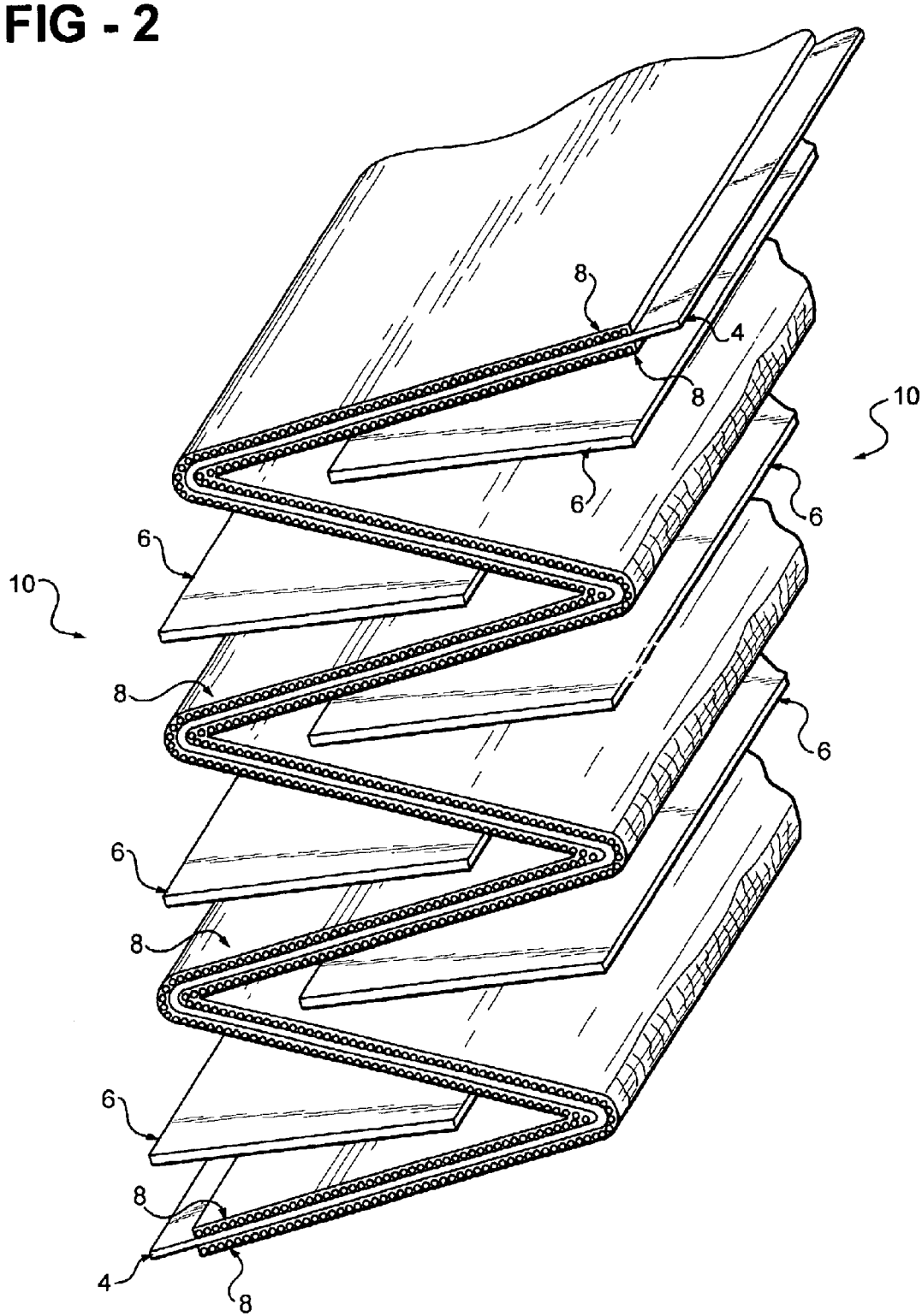
FIG. 2 shows an embodiment of the present invention of a positive electrode folded in a zigzag configuration with negative electrode disposed within the folds.

A second embodiment of the present invention (also referred to as "Variation 1") is shown in FIG. 2. This is a zigzag electrode with interleaved single electrodes. In the embodiment shown, the positive electrode 4 is repeatedly folded in a zigzag configuration with a separator 8 on each side. A single negative electrode is disposed into one or more, and preferably each, of the folds 10 of the zigzag arrangement. This design utilizes both sides of all of the electrodes and the total electrode surface area is utilized. However, the parts count reduction is limited to about a 50% reduction over the conventional prismatic battery cell design. It is noted that roles of the positive and negative electrodes may be reversed. That is, a single negative electrode may be folded in a zigzag configuration while a single positive electrode is disposed in each of the folds.

Figure 3A:
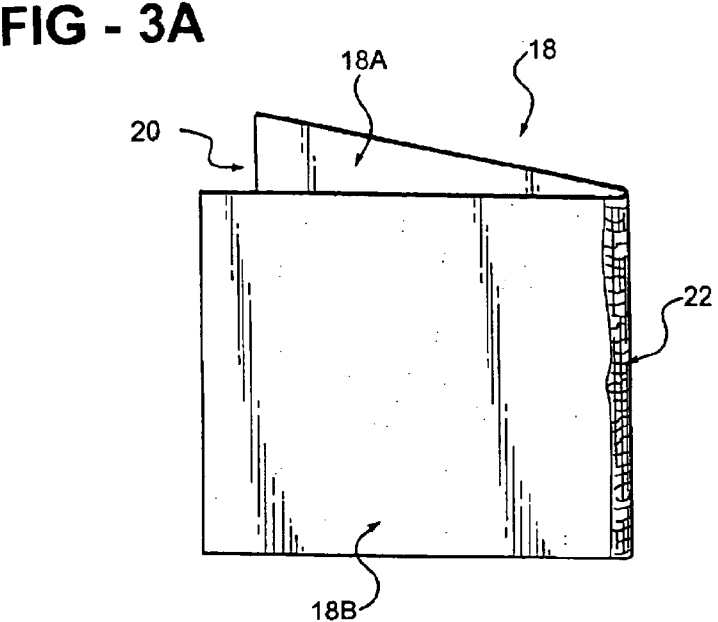
FIG. 3A shows an embodiment of the present invention of a centrally connected electrode pair referred to as a bifold electrode pair.
Figure 3B:
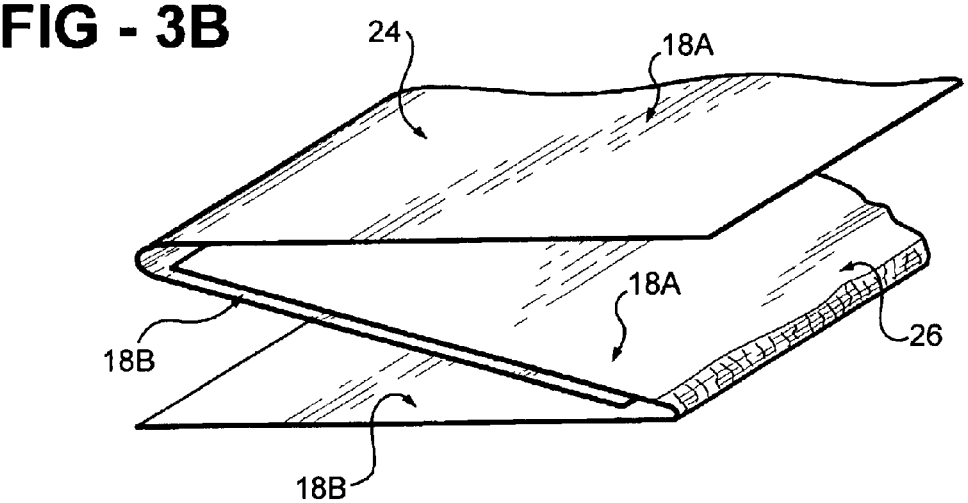
FIG. 3B shows an embodiment of the present invention of a positive bifold electrode pair interweaved with a negative bifold electrode pair.
Figure 3C:
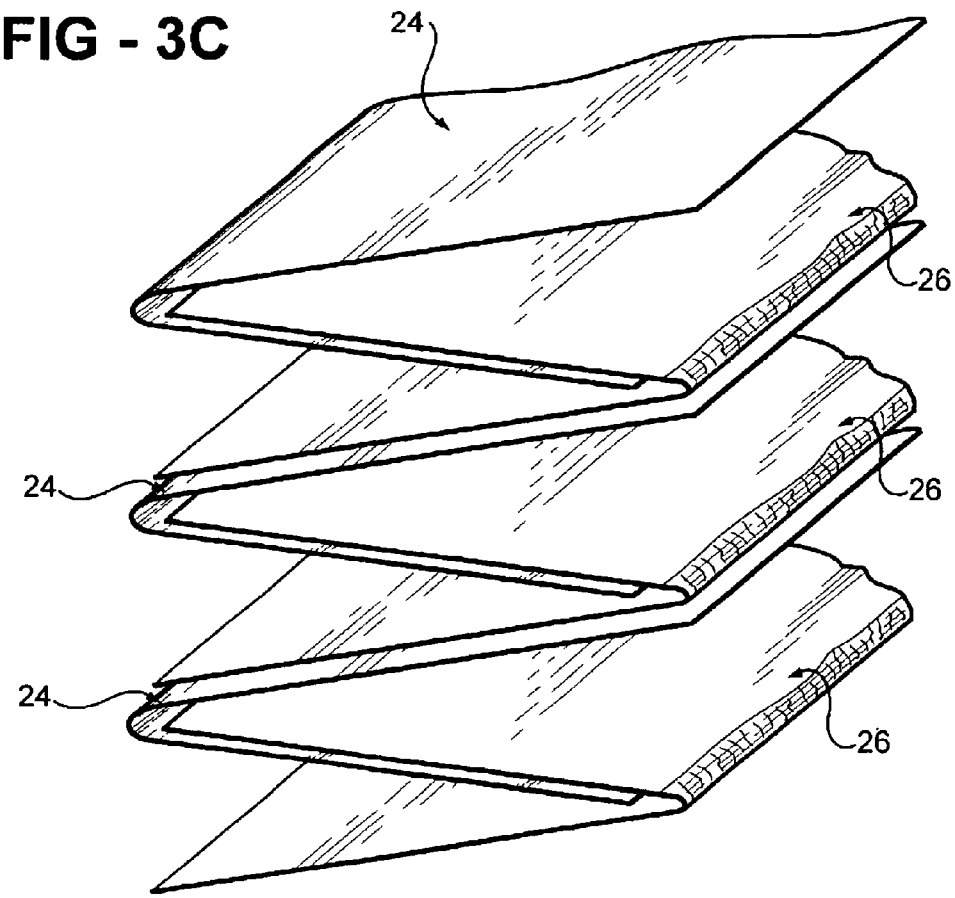
FIG. 3C shows a stack of interweaved positive and and negative bifold electrodes.

A third embodiment of the invention (also referred to as "Variation 2") is shown in FIGS. 3A–C. A folded centrally connected electrode pair 18, referred to herein as a "bifold electrode pair", is shown in FIG. 3A. The bifold electrode 18 has a closed end 22 referred to as the fold line or crease of the bifold electrode. The bifold electrode also has a fold 20 between the two segments 18A and 18B. Active electrode material may be removed from the fold line 22 to facilitate folding of the bifold electrode. Each bifold electrode 18 includes a pair of electrode segments or legs 18A and 18B. The fold line 22 of the folded pair serves as a common edge of the first electrode leg 18A and the second electrode leg 18B. As noted, the V-shaped region between the legs 18A and 18B is the fold 20.

Referring to FIG. 3B, a positive bifold electrode 24 and a negative bifold electrode 26 are interleaved. That is, an electrode leg 18B of a positive bifold electrode 24 is disposed within the fold of a negative bifold electrode while an electrode leg 18A of the negative bifold electrode 26 is disposed within the fold of the positive bifold electrode 24. Separators (not shown) electrically isolate the positive electrode legs from the negative electrode legs. The arrangement shown in FIG. 3B is a single set of interleaved positive and negative bifold electrodes. Multiple sets of interleaved positive and negative bifold electrodes may then be stacked as shown in FIG. 3C to form an electrode stack that can be placed within a prismatic battery case. Separators (not shown) are placed between the positive and negative electrode legs within the stack. This design utilizes both sides of all of the electrodes and the total electrode surface area is utilized. In this case the electrode count is reduced a total of 50% over the conventional prismatic electrochemical cell design.

Figure 4A:
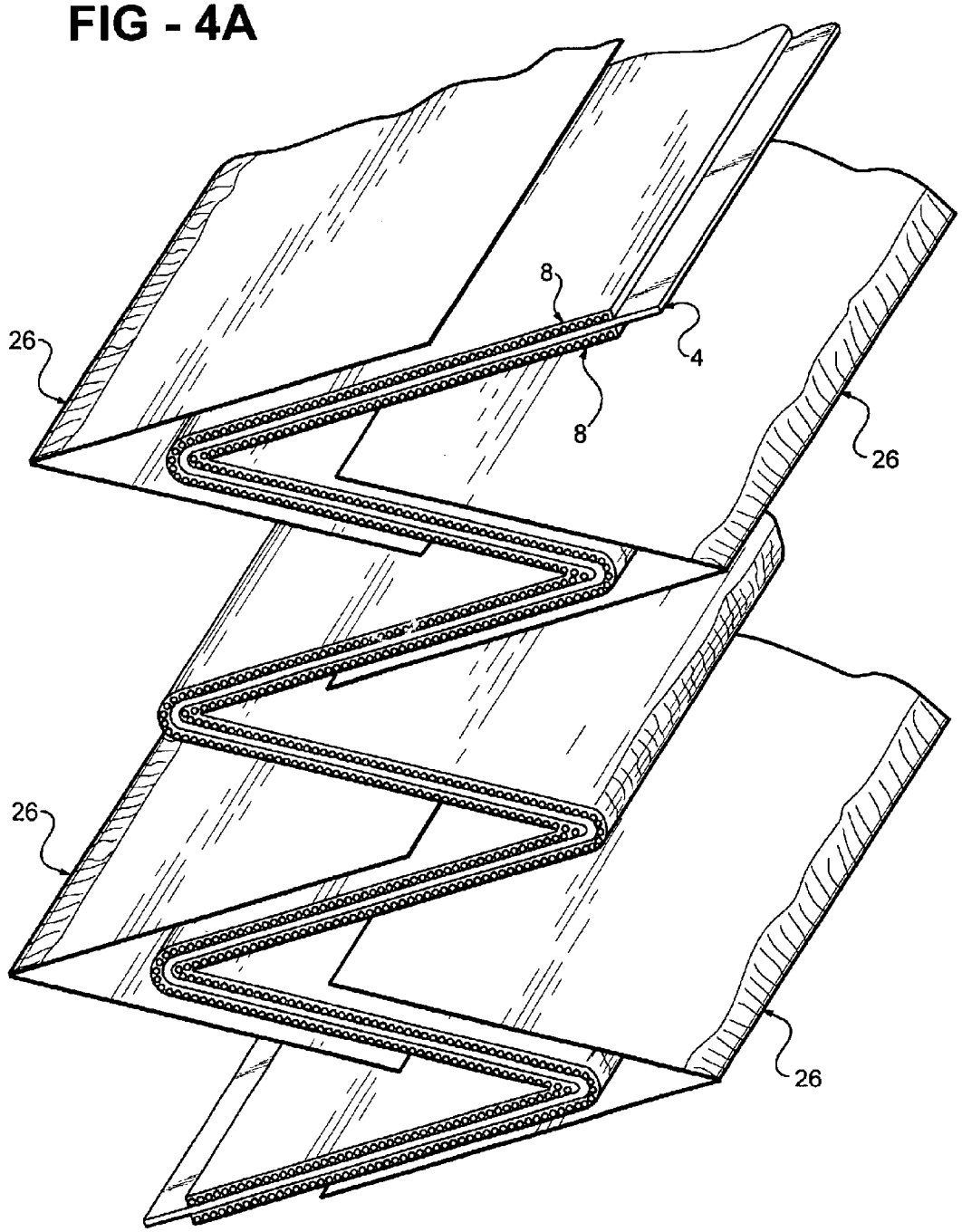
FIG. 4A is an embodiment of the present invention of a positive electrode folded in a zigzag configuration with interleaved electrode pairs.
Figure 4B:
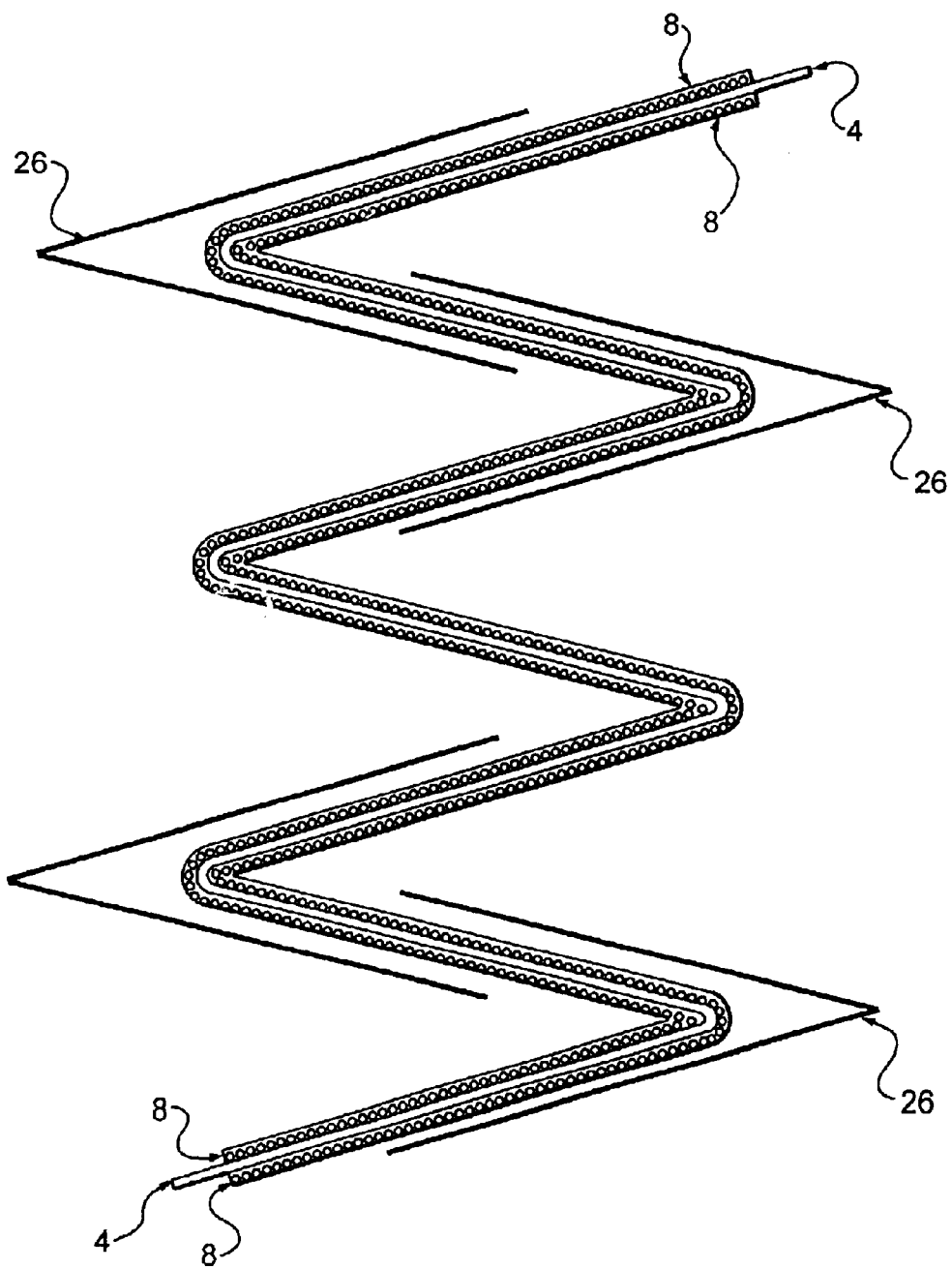
FIG. 4B is a cross-sectional view of FIG. 4A.

A fourth embodiment of the present invention (also referred to as "Variation 3") is shown in FIGS. 4A and 4B. This is an example of a zigzag electrode with interleaved bifold electrode pairs. The positive electrode 4 is folded in a zigzag configuration with a separator 8 on each side. Centrally connected bifold negative electrode pairs 26 are inserted on both sides of the zigzag electrode so as to fill each of the folds with a single leg of a negative electrode bifold pair. As shown, the legs of each bifold negative electrode 26 are inserted within adjacent folds on the same side of the zigzag structure formed by the positive electrode 4. As noted, it is preferable that a bifold negative electrode pair 26 is inserted over every other fold line of the zigzag positive electrode configuration on each side of the zigzag electrode. In this manner, only a single negative electrode leg (of a bifold pair) is disposed within each of the folds of the zigzag positive electrode 4. This design utilizes both sides of all electrodes and the total electrode surface area is utilized. In this case, the negative electrode count is reduced another 50% so that the total parts count reduction is about 75% over the conventional prismatic battery cell design. FIG. 4A is the three-dimensional view of the electrode structure while FIG. 4B is a cross-sectional view. It is noted, that the roles of the positive and negative electrodes may be reversed. That is, the negative electrode may be folded in a zigzag configuration while the legs of positive electrode bifolds are positioned within the folds.

Figure 5:
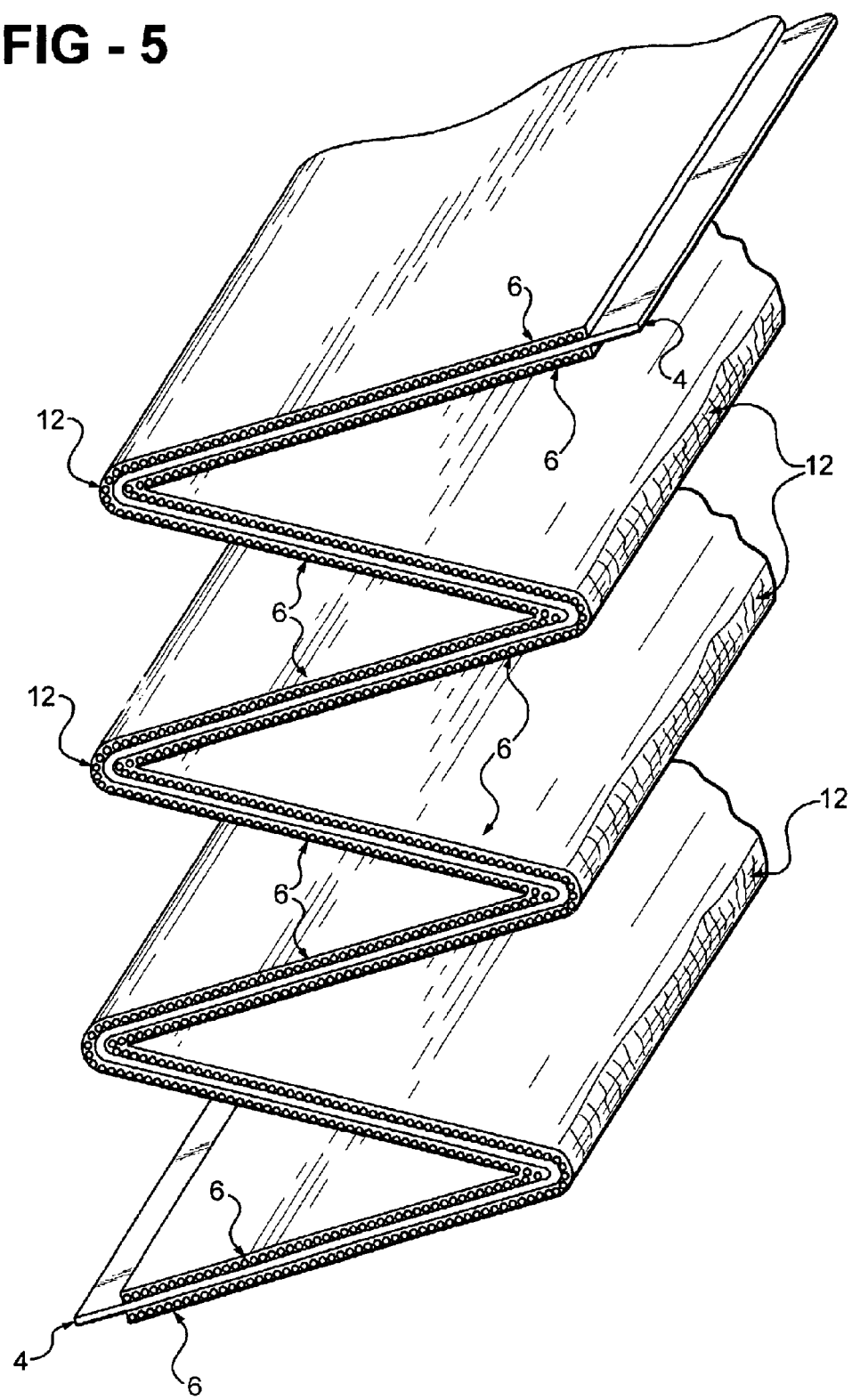
FIG. 5 is a trielectrode stack folded in a zigzag configuration.

A fifth embodiment of the invention (Also referred to as "Variation 4") is shown in FIG. 5. FIG. 5 shows a trielectrode zigzag electrode stack. In this embodiment of the invention, a central positive electrode 4 is disposed between two negative electrodes 6. Separators (not shown) are disposed between the central positive electrode and the two negative electrodes. The entire electrode stack (i.e., central positive electrodes, outer negative electrodes and separators) is repeatedly folded in a zigzag configuration. In this case, the total electrode parts count is reduced to three. The outer negative electrodes have about half the capacity loading as in the other embodiments described above. The negative electrodes are folded over themselves so that only 50% of the negative electrodes are utilized. However, both sides and 100% of the positive electrode surface area is utilized so that the total electrode surface area utilized for charge-discharge reactions is about 67%. Electrode material may be removed from the creases 12 to facilitate folding. It is noted that the roles of the positive and negative electrodes may be reversed. That is, a central negative electrode may be disposed between two positive electrodes.

Figure 6A:
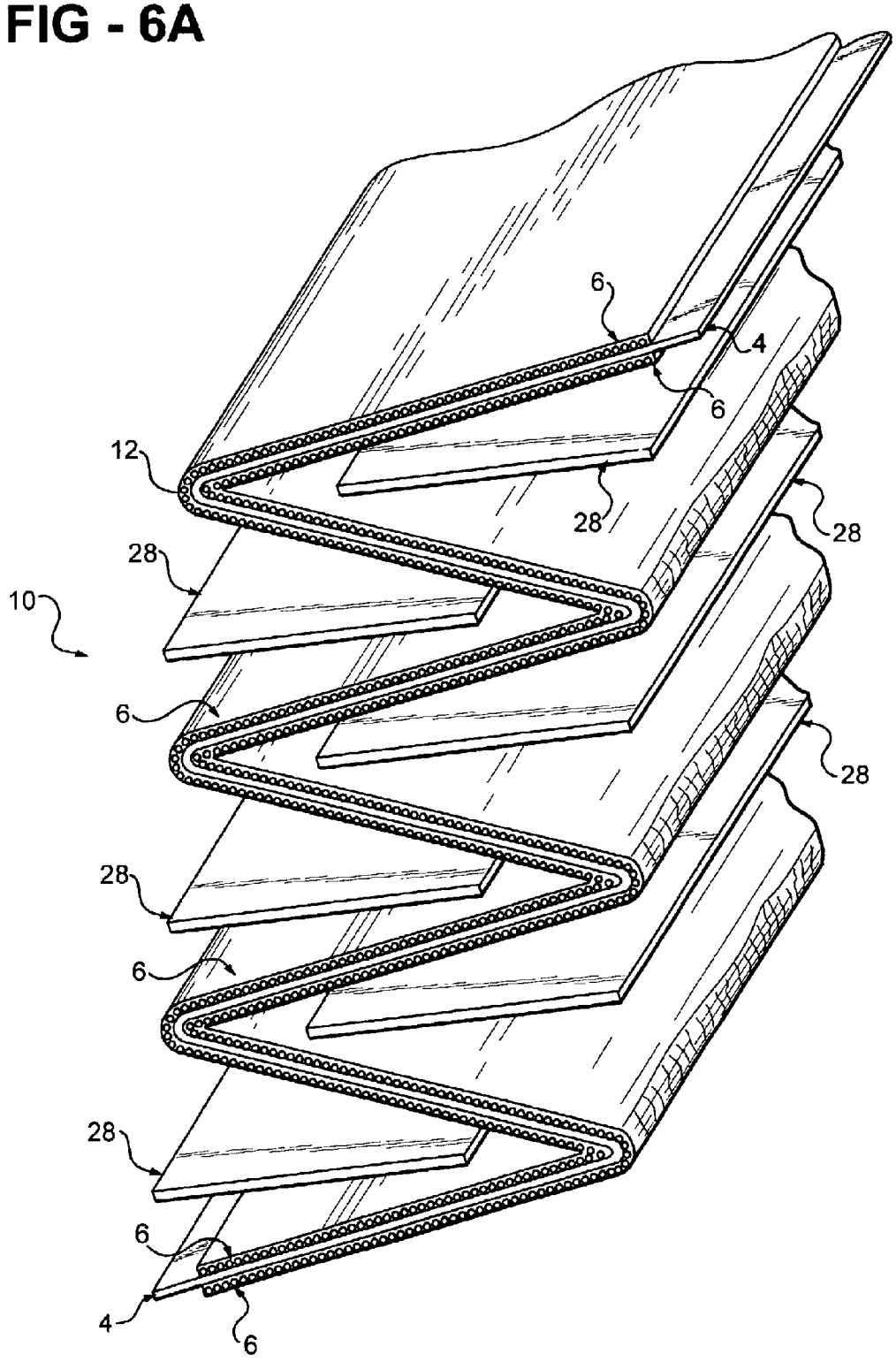
FIG. 6A is a trielectrode zigzag stack with hydrophobic material disposed within the folds.
Figure 6B:
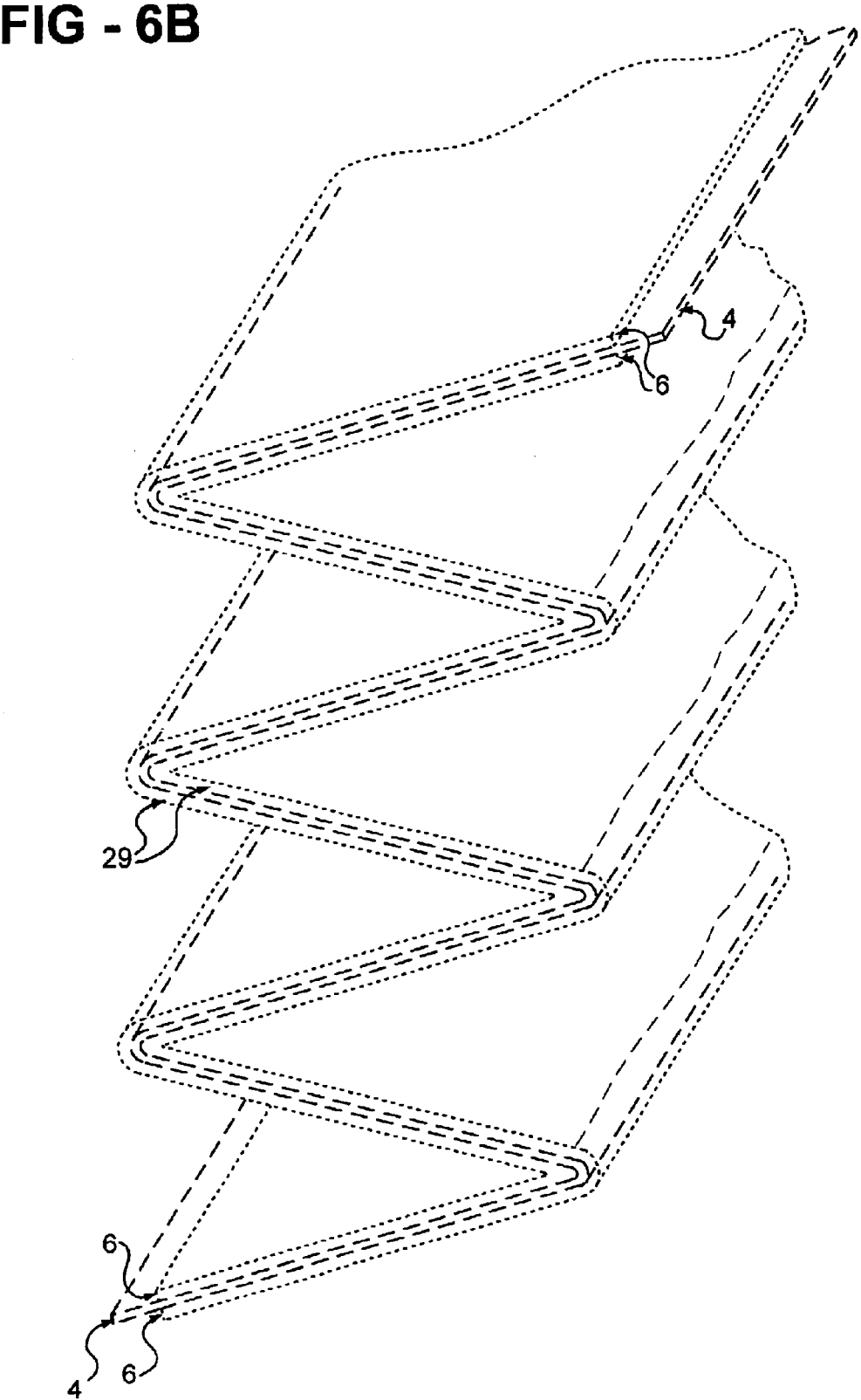
FIG. 6B is trielectrode zigzag stack sandwiched between two hydrophobic layers.

It is noted that in the fifth embodiment (Variation 4) shown in FIG. 5, the surfaces of the negative electrodes 6 that are folded over on themselves and not utilized in the charge discharge reaction of the electrode can still be utilized to advantage as recombination surfaces. This is best achieved through the use of a hydrophobic layer inserted into the folds on each side of the zigzag configuration. This is shown in FIG. 6A where hydrophobic layers 28 are inserted within the folds 10 of the trielectrode stack. This can also be done by encasing the trielectrode stack between two hydrophobic layers 28 prior to the folding operation. FIG. 6B shows the trielectrode stack that includes the positive electrode 4 and the two negative electrodes 6 on both sides of the positive electrode 4. The trielectrode stack is sandwiched between two hydrophobic layers 29.

It may also be possible to utilize the back sides of the negative electrodes as an electrolyte reservoir by encasing the trielectrode stack between two separators (to form a "separator wrap"). To best retain the ability to use the back sides as recombination surfaces, it may be useful to coat the back sides of the negative electrodes with a hydrophobic coating such as PTFE. Additionally, for the same reason, it is preferred that this outside separator wrap be less hydrophilic (or more hydrophobic) than the electrochemically active electrode separators that are inserted between positive and negative electrodes. The electrochemically active electrode separators (inserted between positive and negative electrodes) are usually treated to provide for a hydrophilic nature since the polyolefin materials typically used are hydrophobic by nature. Thus, a less hydrophilic version (useful for the separator wrap) can be made by elimination or reduction of the hydrophilic treatment.

Parts count reduction over the conventional prismatic design is an important objective of this invention. Another objective is high utilization of the electrode surfaces. The table below shows the parts count for the invention and variations in comparison to conventional prismatic cells.

|  | Part Count | Surface Utilization |
|---|---|---|
| Prismatic cells | N | 100% |
| Bielectrode zigzag stack | 2 | 50% |
| Variation 1 | N/2 + 1 | 100% |
| Variation 2 | N/2 | 100% |
| Variation 3 | N/4 + 1 | 100% |
| Variation 4 | 3 | 67% |

The bielectrode zigzag stack (FIGS. 1A and 1B) and the 4 variations all provide for substantially reduction in parts count over the conventional prismatic cell design. The most substantial reductions were with the base case, bielectrode zigzag stack (as shown in FIGS. 1A and 1B), and Variation 4. Variation 4 provides a higher power approach due to more complete utilization of electrode surface area and also provides surface area of recombination allowing for a robust low pressure design.

Another aspect of the present invention involves folding of the electrode into a zigzag configuration. At the fold point or crease, it may be difficult to maintain the integrity of the active material, which may tend to delaminate at the tight radius of the folds. One way to avoid this is provide strips of substrate at regular intervals that are not loaded with active material. The electrode stack could then be folded at these fold points. For example, a metal foam substrate could be pre-calendared to minimized loading of active material in the fold region. In another example, expanded metal substrate could be fabricated with an integral non-expanded region to avoid active material loading.

Yet another aspect of the present invention involves the connection of the electrodes to the battery cell terminals. One approach would be to weld a positive electrode tab to an edge of each of the positive electrodes and a negative electrode tab to an opposite edge of each of the negative electrodes. The positive electrode tabs can be collected to a positive terminal and the negative electrode tabs can be collected to a negative terminal. This is similar to what is now conventionally done with high-power cylindrical cells. As noted, the positive electrode tabs and terminal would be in an oriented oppositely from the negative electrode tabs and terminals.

Figure 7:
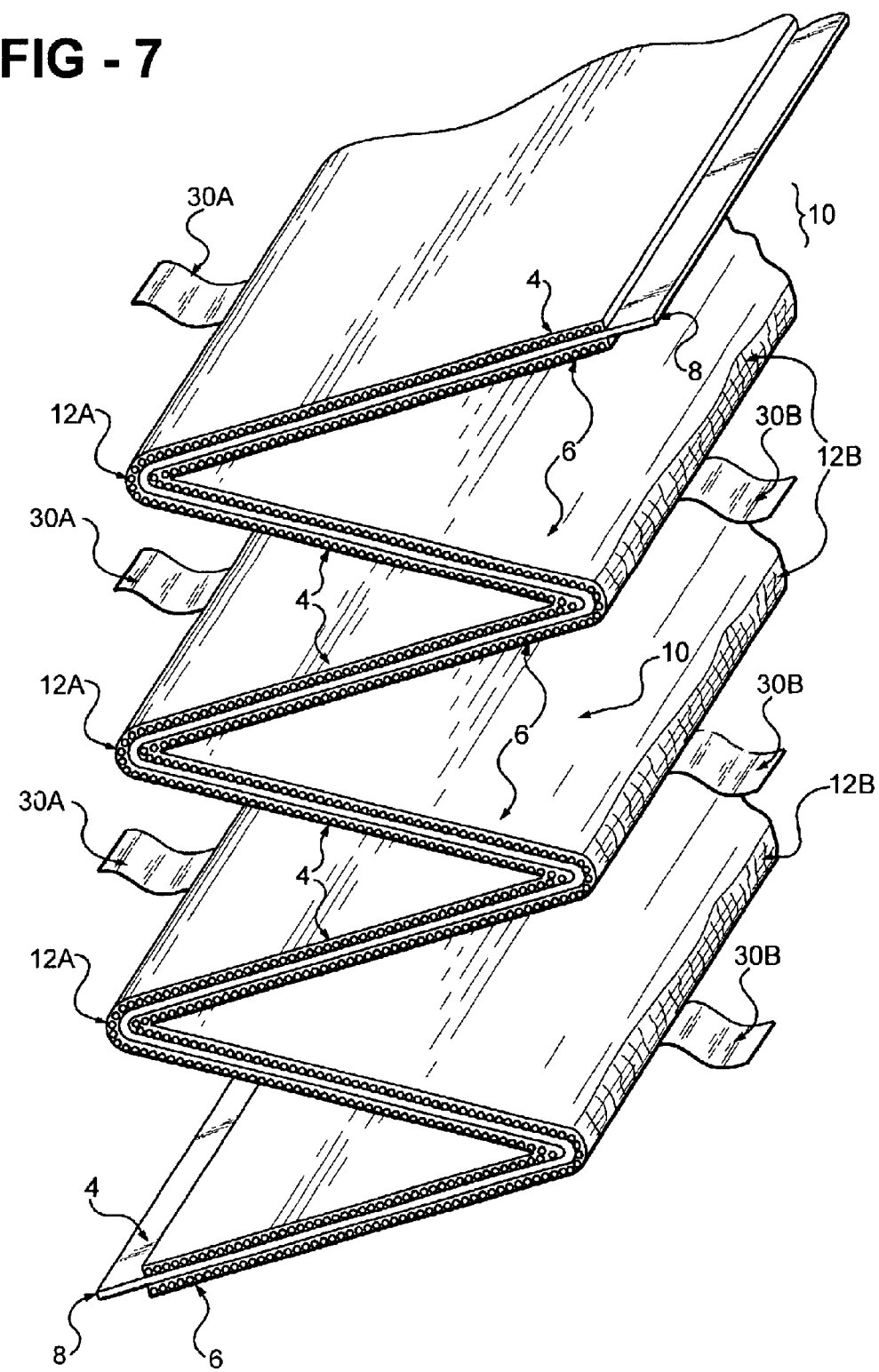
FIG. 7 is a bielectrode zigzag stack that includes positive and negative current collection tabs.

In a novel approach, utilizing the zigzag electrode stack concept, current collection could be achieved by connection to the fold lines or creases in the zigzag stack. Current collection is rotated 90 degrees in this case. In some cases this avoids the use of a separate current collector strip. For example, with the bielectrode zigzag stack (as shown in FIGS. 1A and 1B), the positive and negative electrodes can be separately collected along the fold lines or creases on opposite sides of the electrode stack. FIG. 7 shows the basic bielectrode zigzag stack from FIG. 1A. In this case, positive electrode tabs 30A are affixed (preferably welded) to the fold lines or creases 12A of the positive electrode 4. Likewise, negative electrode tabs 30B are affixed (preferably welded) to the fold lines or creases 12B of the negative electrode 6. The accordion shaped structure shown in FIG. 7 will be further compressed down to fit into a prismatic case. The positive tabs 30A will preferably all be connected to a positive terminal while the negative tabs 30B will preferably all be connected to a negative terminal.

FIG. 8 again shows the Variation 4 from FIG. 5 with the fold lines (shown as fold lines or creases 12B in FIG. 8) vertically oriented. In this case, each fold line or crease 12B is the fold line or crease of one of the two negative electrodes 6. Hence, the negative electrode current can be collected by placing negative electrode tabs 30B at the fold lines on both sides of the zigzag electrode structure. The positive electrode current can be collected from the top edge 40 of the positive electrode 4. The positive electrode current can also be collected from the bottom edge of the positive electrode 4 (not shown). The accordion shape of the zigzag configuration may be further compressed to appropriately fit into a prismatic case.

Figure 9A:
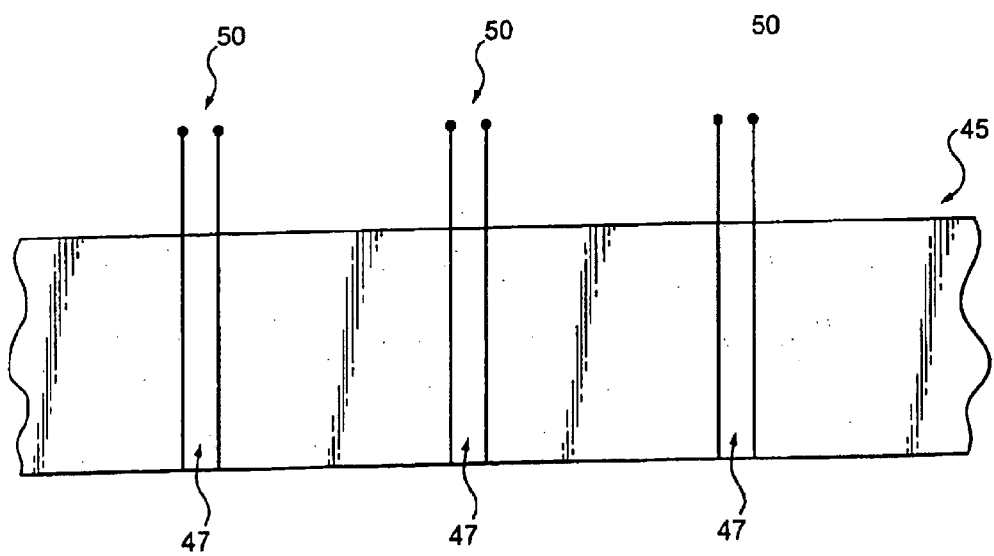
FIG. 9A shows an electrode belt with current collection wires placed a fold points along the belt.
Figure 9B:
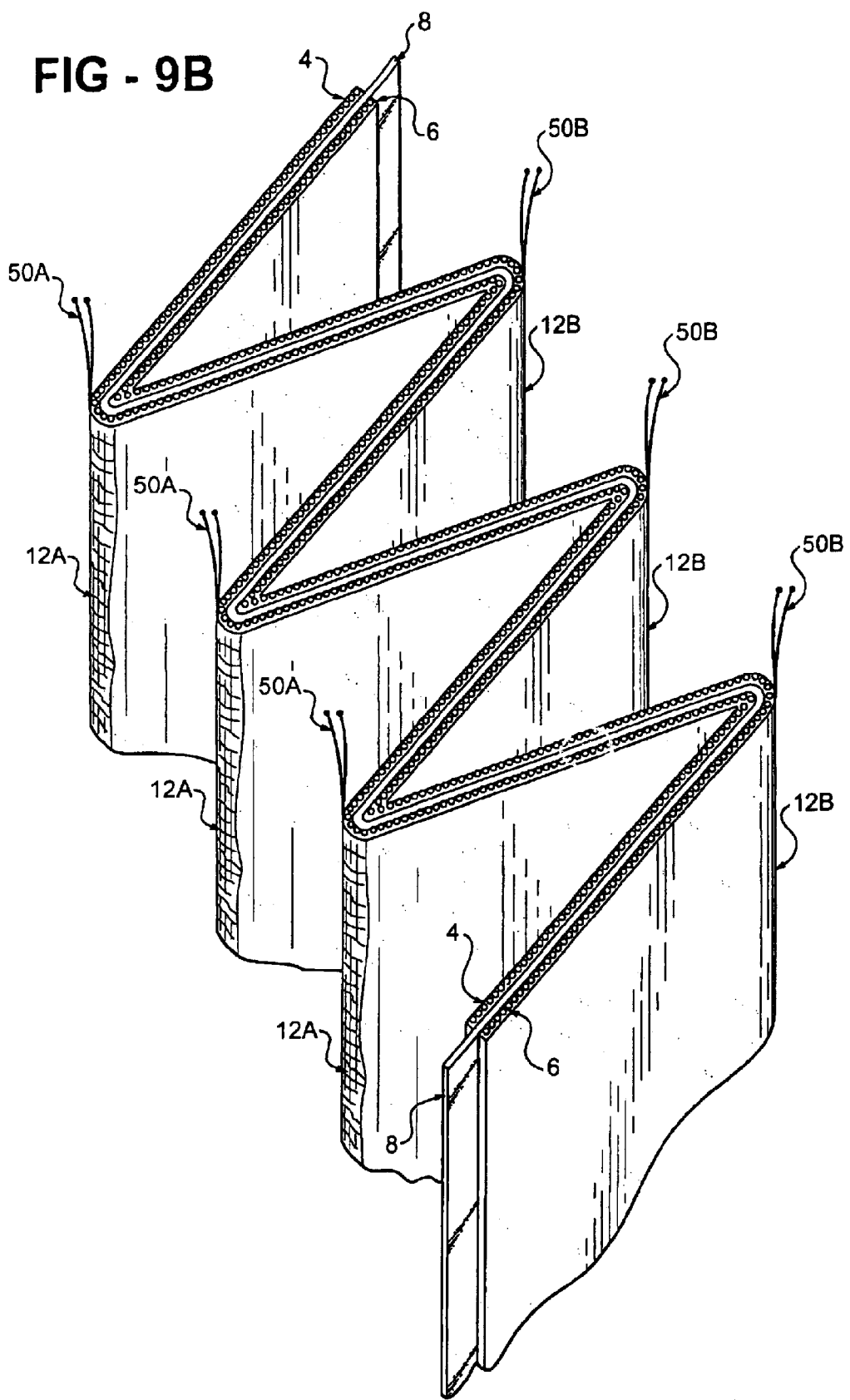
FIG. 9B shows a bielectrode zigzag stack with positive and negative current collection wires.

In another approach, aimed at more facile folding and better current collection, wires can be connected to the electrode belt at regular intervals. They can then become a bending radii for fold points on the belt that are free from active material. The wires also extend beyond the surface of the electrode for collection and connection to the current collectors and battery cell terminals. FIG. 9A shows an electrode belt 45 with wires 50 connected at the fold points 47. FIG. 9B is an example of the basic bielectrode zigzag stack from FIG. 8 wherein the fold lines 12A of the positive electrode 4 and fold lines 12B of the negative electrode have been vertically oriented. Flexible wires 50A are affixed (preferably welded) to the fold lines 12A of the positive electrode 4 to form the positive electrode connections. Likewise flexible wires 50B are affixed (preferably welded) to the fold lines 12B of the negative electrode 6 to form the negative electrode connections. Preferably, the active material is removed from the fold lines 12A and 12B to facilitate folding and to facilitate the connection of the wires to the fold lines.

The concepts described above are applicable to all electrode chemistries. Active electrode materials may be divided into positive electrode materials and negative electrode materials. Examples of positive electrode materials are powders of lead oxide, lithium cobalt dioxide, lithium nickel dioxide, lithium nickel dioxide, lithium manganese oxide compounds, lithium vanadium oxide compounds, lithium iron oxide, lithium compounds, i.e., complex oxides of these compounds and transition metal oxides, manganese dioxide, zinc oxide, nickel oxide, nickel hydroxide, manganese hydroxide, copper oxide, molybdenum oxide, carbon fluoride, etc. Preferably, the positive electrode material is a nickel hydroxide material.

Examples of negative electrode materials include metallic lithium and like alkali metals, alloys thereof, alkali metal absorbing carbon materials, zinc, cadmium hydroxide, hydrogen absorbing alloys, etc. Preferably, the negative electrode material is a hydrogen absorbing alloy. Examples of hydrogen absorbing alloys are provided above. It is within the spirit and intent of this invention that any hydrogen absorbing alloy can be used.

Hence, in particular, the concepts are applicable to nickel-metal hydride batteries where the negative electrode includes a hydrogen storage alloy active material and the positive electrode includes nickel-hydroxide active material. Also, in particular, the concepts are applicable to chemistries such as lithium and lithium-ion batteries where high surface is needed for high power.

The electrodes may be formed by affixing the active materials onto a conductive substrate. The conductive substrate may be any type of conductive support for the active material. Examples of substrates include expanded metal, wire mesh, metal grid, perforated metal, plate, foil and foam. The actual form of substrate used may depend upon whether the substrate is used for the negative or the positive electrode, the type of active material used, whether it is a paste-type or a non-paste-type electrode, etc. Preferably, an expanded metal is used for the base electrode of the present invention. The conductive substrate is preferably formed from a metal such as copper, a copper alloy, nickel, or a nickel alloy. Commonly assigned U.S. Pat. Nos. 5,851,698 and 5,856,047, the contents of which are incorporated by reference herein, disclose negative metal hydride electrodes comprising a substrate made from substantially pure copper.

The active material may be affixed to the conductive substrate in different ways. For example, the active material may be compacted onto the substrate (rolling mills may be used to perform the compaction). Alternately, the active material may first be formed into a paste by adding water and a "thickener" such as (PVA), carboxymethyl cellulose (CMC) or hydroxypropylmethyl cellulose (HPMC) or the like to the active composition. The paste is then applied to the substrate to form the base electrode.

As noted above, the zigzag and bifold electrodes may be placed into prismatic cases to form prismatic electrochemical cells. It is also conceivable that the zigzag and bifold electrodes be placed into the cell compartments of a monoblock battery case to form a monoblock battery. Examples of monoblock batteries are provided in U.S. patent application Ser. No. 09/139,384 which is incorporated by reference herein. Another example of a monoblock battery is provided in U.S. Pat. Ser. No. 09/670,155 which is incorporated by reference herein.

It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

We claim:

1. An cell, comprising:
   a positive electrode folded in a zigzag configuration having folds and creases;
   at least one bifold negative electrode having a first leg and a second leg, said first leg and said second leg disposed within a first and a second fold on the same side of the zigzag configuration of said electrode; and
   an aqueous alkaline electrolyte, wherein said positive electrode comprises a nickel hydroxide material and said at least one negative electrode comprises a hydrogen storage alloy.

2. The electrochemical cell of claim 1, wherein said first leg and said second leg are disposed in adjacent folds on the same side of the zigzag configuration of said positive electrode.

3. The electrochemical cell of claim 1, wherein said at least one bifold negative electrode is a plurality of bifold negative electrodes, each of said bifold negative electrodes having a first leg and a second leg.

4. The electrochemical cell of claim 3, wherein said plurality of bifold negative electrodes are disposed over alternating creases on each side of the zigzag configuration of said positive electrode.

5. An electrochemical cell, comprising:
   an electrode stack including a positive electrode disposed between a first and a second negative electrode, said electrode stack folded in a zigzag configuration with folds and creases; and
   an aqueous alkaline electrolyte, wherein said positive elect:ode comprises a nickel hydroxide material and said negative electrodes comprise a hydrogen storage alloy.

6. The electrochemical cell of claim 5, further comprising a hydrophobic material disposed in at least one of the folds of the zigzag configuration of said electrode stack.

7. The electrochemical cell of claim 5, wherein said electrode stack further comprises a first and a second hydrophobic layer, each of said hydrophobic layers disposed on an outer race of a corresponding negative electrode, said electrode stack folded to form said zigzag configuration.

8. An electrochemical cell, comprising:
   a negative electrode folded in a zigzag configuration having folds and creases;
   at least one bifold positive electrode having a first leg and a second leg, said first leg and said second leg disposed within a first and a second fold on the same side of the zigzag configuration of said electrode and;
   an agueous alkaline electrolyte, wherein said at least one positive electrode comprises a nickel hydroxide material and said negative electrode comprises a hydrogen storage alloy.

9. The electrochemical cell of claim 8, wherein said at least one bifold positive electrode is a plurality of bifold positive electrodes, each of said bifold positive electrodes having a first leg and a second leg.

10. The electrochemical cell of claim 9, wherein said plurality of bifold positive electrodes are disposed over alternating creases on each side of the zigzag configuration of said negative electrode.

11. An electrochemical cell, comprising:
    an electrode stack including a negative electrode disposed between a first and a second positive electrode, said electrode stack folded in a zigzag configuration with folds and creases; and
    an aqueous alkaline electrolyte, wherein said positive electrodes comprise a nickel hydroxide material and said negative electrode comprises a hydrogen storage alloy.

12. The electrochemical cell of claim 11, comprising a hydrophobic material disposed in at least one of the folds of the zigzag configuration of said electrode stack.

13. The electrochemical cell of claim 11, wherein said electrode stack further comprises a first and a second hydrophobic layer, each of said hydrophobic layers dispose on an outer face of a corresponding positive electrode, said electrode stack folded to form said zigzag configuration.

* * * * *